United States Patent [19]

Kawasaki et al.

[11] Patent Number: 4,972,564
[45] Date of Patent: Nov. 27, 1990

[54] APPARATUS FOR CORRECTING SURFACE IMPERFECTIONS ON A SURFACE OF GEAR TOOTH

[75] Inventors: Yoshiki Kawasaki, Tokyo; Hitoshi Maruyama, Kanagawa, both of Japan

[73] Assignee: Isuzu Jidosha Kabushiki Kaisha, Japan

[21] Appl. No.: 427,466

[22] Filed: Oct. 27, 1989

[30] Foreign Application Priority Data

Oct. 28, 1988 [JP] Japan .................... 63-274186

[51] Int. Cl.⁵ ............................................. B24B 39/00
[52] U.S. Cl. ............................................. 29/90.6; 51/26; 51/287; 409/4
[58] Field of Search .............. 409/4, 31; 51/26, 287; 29/90.6

[56] References Cited

U.S. PATENT DOCUMENTS

| 1,912,216 | 5/1933 | Page | 51/26 |
| 1,990,239 | 2/1935 | Miller | 51/26 |
| 2,105,896 | 1/1938 | Stubbs | 51/26 |
| 2,352,557 | 6/1944 | Miller | 51/26 |
| 4,414,780 | 11/1983 | Jorgensen | 51/26 |

FOREIGN PATENT DOCUMENTS

| 309870 | 5/1930 | United Kingdom | 51/26 |
| 332230 | 7/1930 | United Kingdom | 51/26 |

Primary Examiner—Daniel W. Howell
Attorney, Agent, or Firm—Ostrolenk, Faber, Gerb & Soffen

[57] ABSTRACT

An apparatus for correcting surface imperfections, especially as by a blow, on a surface of gear tooth includes a supporting device for a work gear so as to be capable of vibrating the work gear in the direction of the axis of the latter and burnishing gears which are rotatable and are capable of being brought into engaging contact with the work gear.

4 Claims, 3 Drawing Sheets

FIG. I
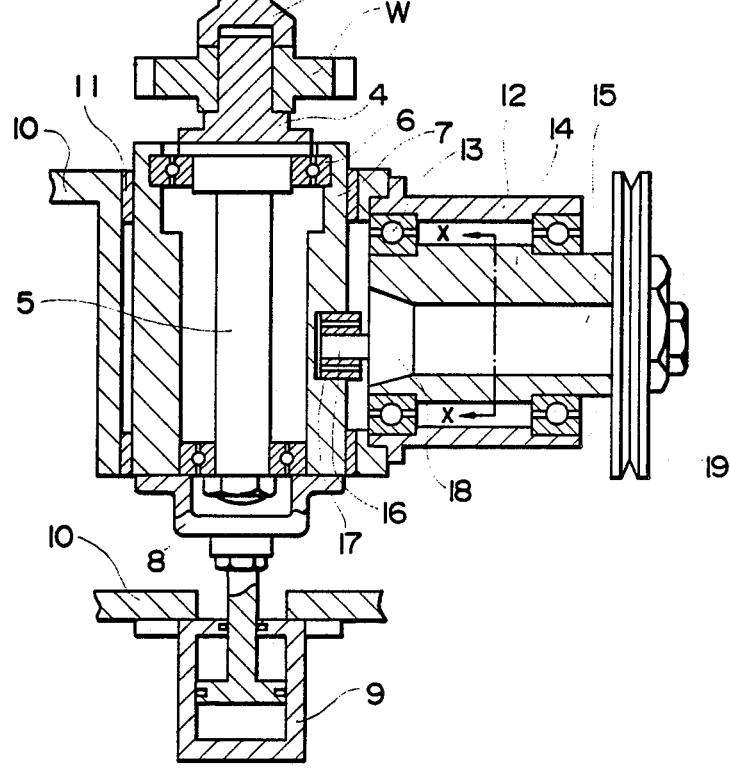
FIG. 2
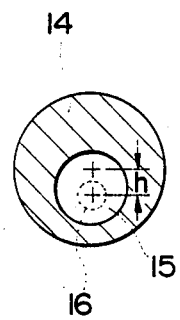

FIG. 4
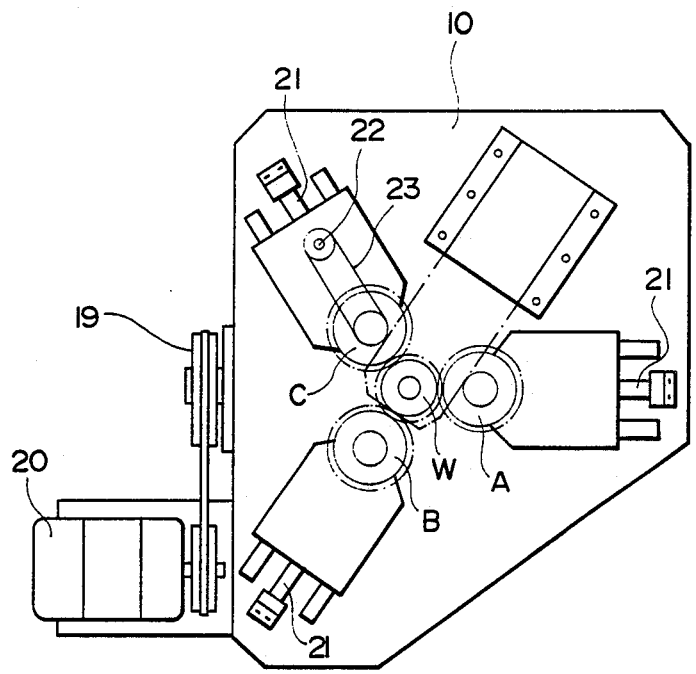
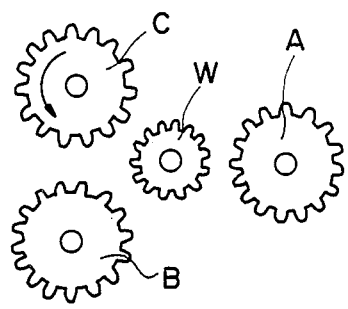
FIG. 5A
PRIOR ART
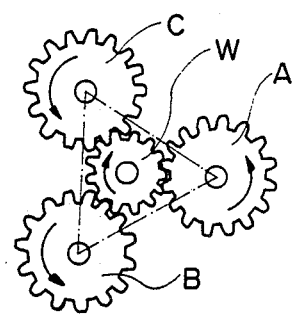
FIG. 5B
PRIOR ART

APPARATUS FOR CORRECTING SURFACE IMPERFECTIONS ON A SURFACE OF GEAR TOOTH

BACKGROUND OF THE INVENTION

The present invention relates to an apparatus for correcting surface imperfections such as scratches, dents, bruises, burrs, etc which are caused on a surface of finished gear tooth, and more particularly, to such apparatus for removing and correcting a flaw or bruise, especially one caused by a blow, on a surface of finished gear tooth.

A power transmission gear for use in a machine tool, motor car, etc is generally manufactured by cutting material with a gear cutting machine, then finishing the gear with a grinding machine. At this time, however, burrs would be caused on a tooth surface during a machining operation and bruises from a blow would be caused while a work is carried to the next step, resulting a source of generating a noise while gears are engaged.

Japanese Laid-open Patent Application No. Sho 61-236425 discloses that a gear having only a dedendum such that the diameter of its pitch circle matches an outer diameter of the gear is used as a processing tool, is engaged with a work to be processed by pressing against the latter, and is brought into engaging contact with substantially the entire tooth surface of the work to be processed by relating the processing tool to correct surface imperfections.

In addition, the applicant of the present application has filed Japanese Laid-open Patent Application Sho No. 60-9616 under the title of "an apparatus for burnishing a surface of gear tooth". The outline of this apparatus is shown in FIGS. 5A and 5B.

FIG. 5A shows a state preparatory to operation. Three burnishing gears A, B and C are positioned apart from each other with respect to a work gear W. In FIG. 5B, which shows location of these gears under operation, each of burnishing gears A, B and C goes forward to engage with the work gear W. Under this condition, the center of the burnishing gears A, B and C lies at a respective vertex of an equilateral triangle and the work gear W is evenly pushed by the three burnishing gears A, B and C from three directions. The burnishing gear C is provided with a rotary drive mechanism, so that, in FIG. 5B, with the work gear W is driven by the burnishing gear C.

The burnishing gears A and B are driven by the work gear W, with the result that all the gears can rotate in the directions shown by arrows to remove burrs on a tooth surface of the work gear W and to correct surface imperfections.

In the conventional apparatus described above, it is possible to remove burrs with certainty but it is difficult to certainly correct surface imperfections (such as a flaw from a blow) with certainty. It is believed that this happens because the grinding performance for correcting a flaw from a blow is insufficient when slippage only in one direction is allowed to occur on a tooth surface by pressing the burnishing gears in rotation to a surface flaw having an increased deformation from a blow. For this reason, a portion made defective from a blow is discovered by sound and touch while the work gear is tried on a gear speeder and is manually removed by means of a triangular stick grindstone.

Consequently, while it is possible to reliably correct a flaw from a blow by hand, such correcting operation is time-consuming and with a conventional automated apparatus for correcting a flaw from a blow it is not certain to correct such a flaw.

SUMMARY OF THE INVENTION

It is an object of the present invention to eliminate the above disadvantages by providing an apparatus for correcting a flaw from a blow on a surface of gear tooth with rapidity and reliability.

The present invention relates to an apparatus for correcting a flaw from a blow on a surface of gear tooth in which apparatus a work gear is supported so as to be capable of vibrating in the direction of the axis thereof and burnishing gears in rotation are brought into engaging contact with the work gear.

Since the work gear vibrates in the direction of the axis thereof and the burnishing gears which engage with the work gear rotate, a tooth surface of the work gear is brought into sliding contact with the burnishing gears in the direction of the axis as well as the direction of rotation, of the work gear, so that the grinding performance is improved and a flaw from a blow on the surface of the work gear tooth can be promptly corrected. Consequently, the present invention makes it possible to correct a flaw from a blow in a very short time without losing accuracy and to provide an automatized apparatus for correcting a flaw in a blow on a surface of gear tooth.

BRIEF DESCRIPTION OF THE DRAWINGS

FIG. 1 is a sectional view of an embodiment of an apparatus for correcting a flaw from a blow on a surface of gear tooth according to the present invention;

FIG. 2 is a sectional view taken on line X—X of FIG. 1;

FIG. 4 is a plan view to help explain the outline of an apparatus for correcting a flaw from a blow;

FIGS. 5A and 5B show an associated mechanism of burnishing gears; FIG. 5A is a plan view showing these positions preparatory to the correcting operation and FIG. 5B is a plan view showing these positions in the correcting operation.

DETAILED DESCRIPTION OF PREFERRED EMBODIMENT

Figure 3:
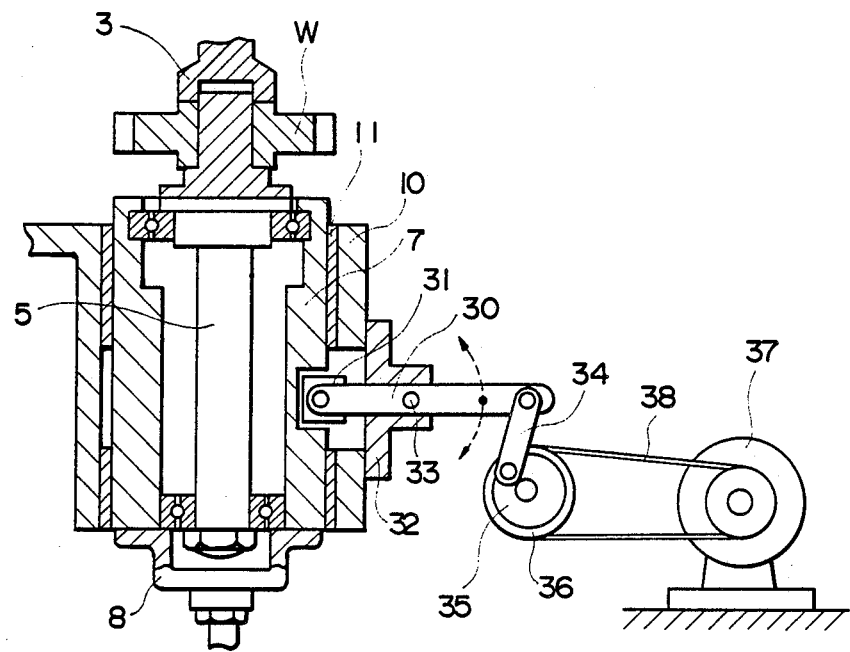
FIG. 3 is a sectional view of another embodiment according to the present invention.

Preferred embodiments of the present invention will be described with reference to the accompanying drawings.

FIG. 1 is a partially sectional view of a mechanism for vibrating a work gear for use in an apparatus for correcting flaws formed by blows on a surface of gear tooth. FIG. 2 is a sectional view taken on line X—X in FIG. 1.

A mandrel 4 on which a work gear W to be corrected is mounted is supported on a work mounting shaft 5. The shaft 5 is rotatably supported through a bearing 6 by a work shaft outer tube 7. The outer tube 7 is disposed through a guide 11 in a housing 10 of an apparatus for correcting a flaw so as to be slidable up and down as viewed in FIG. 1. A clamp cylinder 1 and a balance cylinder 9 are attached to the housing 10 so as to be opposite thereto above and below the outer tube 7 in the direction of the axis of the latter, respectively. The clamp cylinder 1 is provided with a work clamp 3 through a rotary coupling 2 and the balance cylinder 9 is provided with a support member 8 which receives the lower end of the outer tube 7.

A vibrating shaft case 12 is secured to the housing 10 which is located outside the side of the outer tube 7. A rotary shaft 14 in which an eccentric shaft 15 is combined is disposed through a bearing 13 in the vibrating shaft case 12. A slide piece 17 is mounted on a piece 16 which is formed so as to eccentrically protrude from the pointed end of the eccentric shaft 15. The slide piece 17 is engaged with a recess provided on the outer tube 7. Reference number 18 denotes a tapered portion to assemble the eccentric shaft 15 into the rotary shaft 14 and reference number 19 denotes a driving pulley which is fixed to the rotary shaft 14 with a nut.

Since, as shown in FIG. 2, the center of rotation of the rotary shaft 14 is spaced from the center of the piece 16 by the distance h the piece 16 rotates about a circle having a radius of h during the rotation of the rotary shaft 14. When the work gear W is mounted on the mandrel 4 and is clamped by the work clamp 3 by operating the clamp cylinder 1, the work gear W is supported for rotative and up and down movement, since the outer tube 7 which rotatably supports the work mounting shaft 5 is supported by means of the balance cylinder 9 through the support member 8.

When the pulley 19 is rotated by a drive motor 20 shown in FIG. 4, the piece 16 rotates about a circle having a h and the work gear W vibrates up and down at a distance of 2xh since the slide piece 17 engages the recess of the outer tube 7.

FIG. 3 shows another embodiment of a vibration mechanism of the work gear W and like reference characters in FIG. 1 and 3 refer to like elements. A slide piece 31 which engages the recess of the outer tube 7 is connected to one end of a rocking lever 30. The rocking lever 30 is supported by the shaft 33 of support block 32 which is fixed to the housing. The other end of the rocking lever 30 is connected to a crank plate 35 through a connecting rod 34. The crank plate 35 is rotated through a V belt 38 and pulley 36 by means of a drive motor 37.

In a similar manner to the description with reference to FIG. 1, the work gear W is mounted on the work mounting shaft 5 and is clamped in position by operating the clamp cylinder 1. When the drive motor is driven, the rocking lever 30 rocks as shown by dashed arrows and the slide piece 31 causes the outer tube 7 supporting the work gear W to vibrate up and down.

The overall structure and functions of an apparatus for correcting a flaw from a blow on the surface of gear tooth will now be described.

FIG. 4 is a plan view to help explain the outline of an apparatus for correcting a flaw from a blow on a surface of gear tooth. In FIG. 4, a housing 10 includes mechanisms for movably supporting and rotating three burnishing gears A, B and C similar to those shown in FIG. 5 in addition to a mechanism for vibrating work gear W up and down, which mechanism is driven by a drive motor 20 and a pulley 19.

FIG. 5A shows the positions of the gears before the correcting operation in which the burnishing gears A, B and C are separated from each other with respect to the work gear W.

In FIG. 5B, which shows positions of gears under the correcting operation, the burnishing gears A, B and C advance by being pushed by their respective cylinders 21 to engage the work gear W. Under this condition, the centers of three burnishing gears A, B and C lie at respective vertexes and the work gear W is evenly pushed by three burnishing gears in three directions. The burnishing gear C is provided with a rotary drive mechanism comprising a pulley 22 and a V belt 23 which are driven by a motor (not shown). Consequently, when the burnishing gear C is driven, the work gear W rotates with rotation of the gear C and the burnishing gears A and B then rotate with rotation of the gear W, so that all the gears rotate in directions shown with arrows (FIG. 5B).

Under this condition, the work gear W vibrates up and down by operating the motor 20. At this time, powders of grindstone, diamond, etc, are scattered on a faulty or bruised surface on the work gear W. The work gear W vibrates up and down to the extent of amplitude equal to the vibration (in the direction perpendicular to the plane of the drawing in FIG. 5B) while rotating under the condition where the work gear W is supported by the clamp cylinder 1 and the balance cylinder 9. The extent of amplitude of the vibration of the outer tube 17 is variable by changing the position of the piece 16 of the eccentric shaft 15 which is assembled into the rotary shaft 14.

Since the work gear W is arranged at the center of the equilateral triangle of three burnishing gears A, B and C, the work gear W can be stably and rigidly supported. As a result, the load of burnishing gears is evenly put on the work gear W, thus preventing the tooth surface from escaping which would otherwise be caused when being pushed by only one burnishing gear in one direction.

Figure 6:
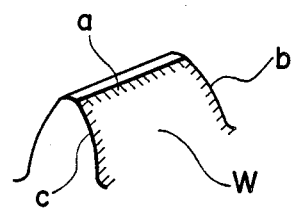
FIG. 6 is a perspective view showing portions of correcting a work gear.

When, with respect to the work gear W, the pressure angle of the burnishing gear A is increased, the angle of torsion of the burnishing gear B is reduced and the angle of torsion of the burnishing gear C is increased, it is possible to all at portions of tooth surface to be corrected to the respective burnishing gears A, B and C. In other words, as shown in FIG. 6, the burnishing gears A, B and C can effectively achieve the correcting operation of an addendum a, tooth edges b and c, of the work gear W, respectively.

Since the burnishing gears A, B and C move in the direction of the width of the teeth thereof, while rotating with respect to the work gear W, the grinding capability of a surface of gear tooth to be corrected is improved, so that a flaw from a blow can be corrected in a very short time.

What is claimed is:

1. An apparatus for correcting surface imperfections on a surface of a work gear; said apparatus comprising:
    support means for supporting a work gear in such a manner that said support means, and with it said work gear, can be vibrated along an axis of said work gear;
    an eccentric shaft rotating in an eccentric manner about a rotation axis;
    driving means for rotating said eccentric shaft eccentrically about said rotation axis;
    a piece fixed to said eccentric shaft and directly engaging said supporting means in such a manner that said support means is vibrated along said work gear axis in response to the rotation of said eccentric shaft; and
    burnishing gear means including burnishing gears which are capable of being brought into engagement with said work gear and being rotated while in contact with said work gear.

2. The apparatus of claim 1, wherein said support means comprises:
   a movable member which is directly coupled to said piece; and
   first and second cylinders located at opposite ends of said movable member and adapted to movably support said movable member for movement along said axis of said work gear.

3. An apparatus according to claim 1, wherein said supporting means includes a tubular member and wherein said piece engages a recess formed in said tubular member.

4. A method for correcting surface imperfections on the surface of a work gear, said method comprises the steps of:
   supporting a work gear on a supporting means in such a manner that said supporting means, and with it said work gear, can be vibrated along an axis of said work gear;
   vibrating said support means in response to the rotation of a piece fixed to an eccentric shaft which is rotating eccentrically about a rotation axis, said piece directly engaging said support means; and
   bringing burnishing gears into engaging contacts with said work gear and rotating said burnishing gears while they are in contact with said work gear.

* * * * *